C. C. THOMAS.
COMBINED GAS ENGINE AND TURBINE AND PROCESS OF CONVERTING HEAT ENERGY INTO POWER.
APPLICATION FILED MAY 26, 1913.
1,152,361.  Patented Aug. 31, 1915.
3 SHEETS—SHEET 1.
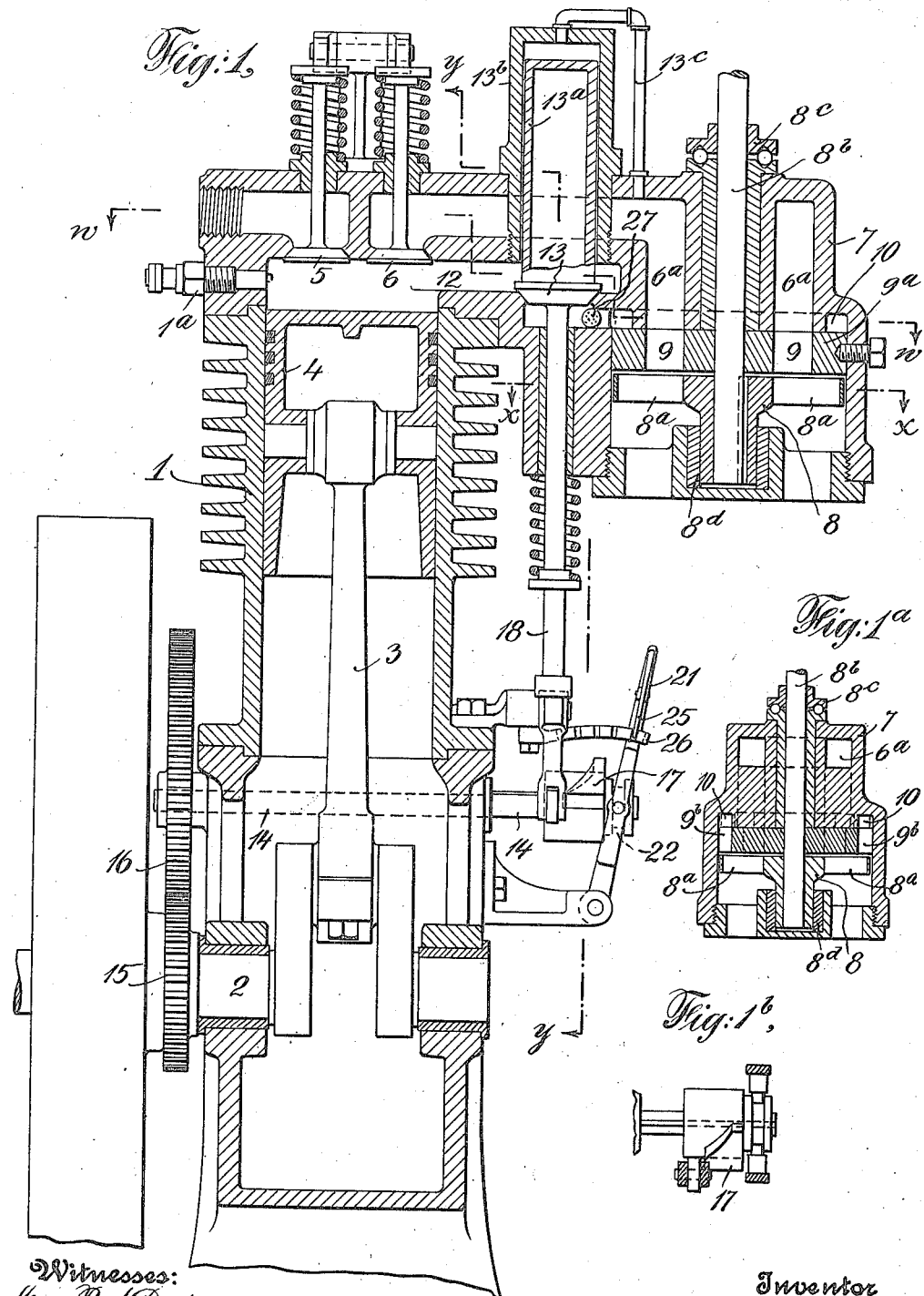
Witnesses:
Max B. A. Doring
Paul H. Franke
Inventor
Carl C. Thomas
By his Attorneys

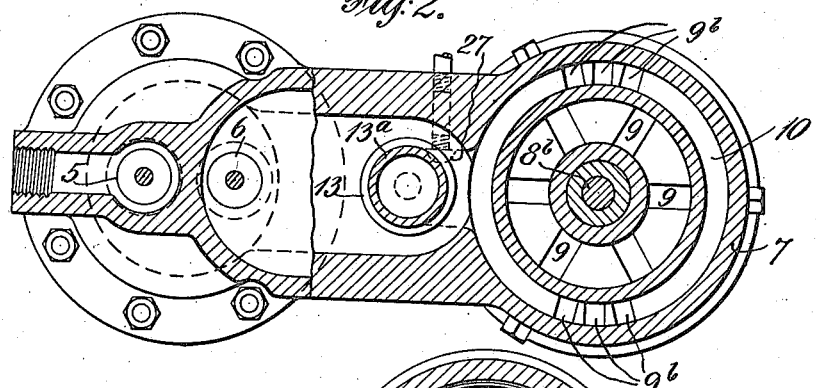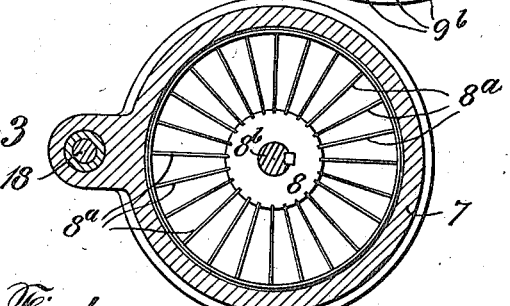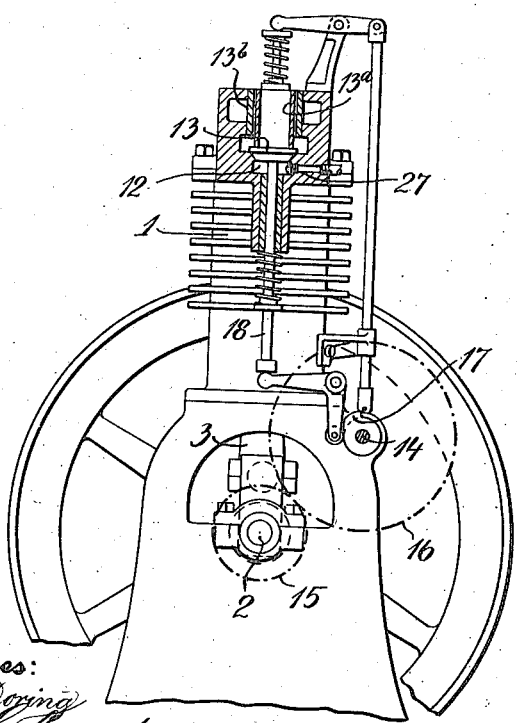

C. C. THOMAS.
COMBINED GAS ENGINE AND TURBINE AND PROCESS OF CONVERTING HEAT ENERGY INTO POWER.
APPLICATION FILED MAY 26, 1913.
1,152,361.
Patented Aug. 31, 1915.
3 SHEETS—SHEET 3.
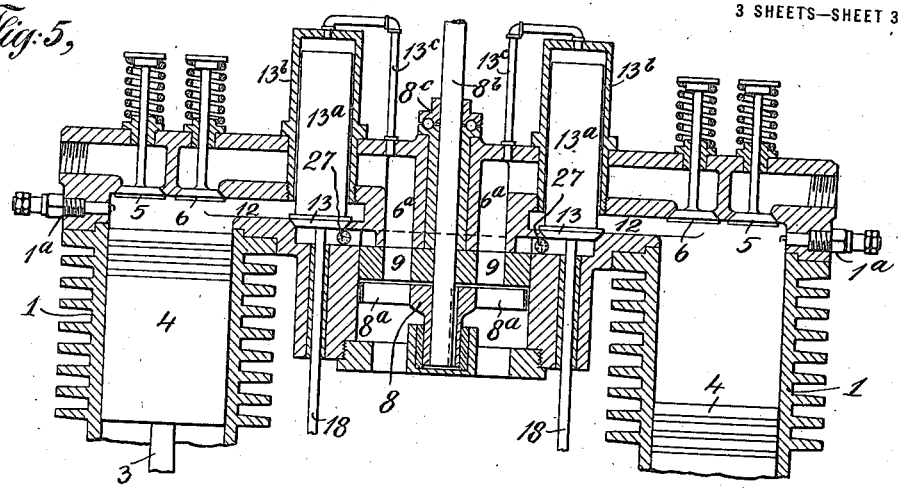
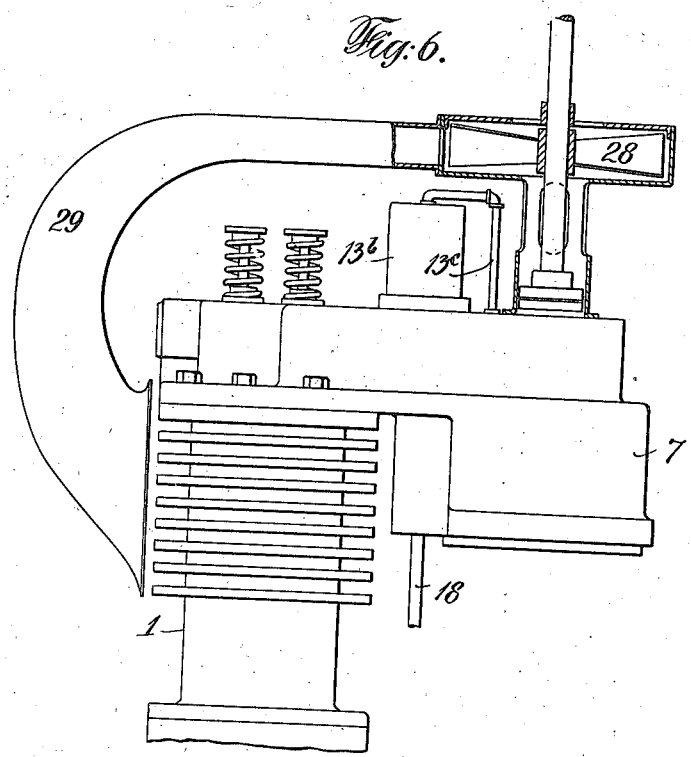

UNITED STATES PATENT OFFICE.

CARL C. THOMAS, OF MADISON, WISCONSIN.

COMBINED GAS ENGINE AND TURBINE AND PROCESS OF CONVERTING HEAT ENERGY INTO POWER.

1,152,361. Specification of Letters Patent. Patented Aug. 31, 1915.

Application filed May 26, 1913. Serial No. 769,881.

*To all whom it may concern:*

Be it known that I, CARL C. THOMAS, a citizen of the United States of America, and a resident of Madison, in the county of Dane and State of Wisconsin, have invented a certain new and useful Combined Gas Engine and Turbine and Process of Converting Heat Energy into Power, of which the following is a specification.

My invention relates to combined internal combustion engines and turbines, and to processes of converting heat energy into power, and as an apparatus comprises a structure which is an improvement upon and modification of the structure set forth in my application for Letters Patent filed April 11, 1913, Sr. No. 760,496.

As a process my invention comprises improvements on the process of converting heat energy into power, set forth in my said prior application.

According to the invention of my said prior application, an internal combustion engine is provided with means for introducing into a suitable turbine a portion of the working gases of an internal combustion engine, early in the working stroke of that engine; water being introduced into the gas and converted into steam. In the arrangement shown in my said former application, the engine is also provided with the ordinary exhaust valve, arranged to open at or near the end of the working stroke, the exhaust gases so discharged from the engine cylinder escaping without passing through the turbine.

According to my present invention, both the normal exhaust gases, and high pressure gases discharged from the engine cylinder during the early portion of the working stroke, are delivered to and passed through a suitable turbine, imparting rotation to the rotor of such turbine. The main purpose of passing the normal exhaust gases through such turbine is to cool the blades of the turbine; but incidentally such normal exhaust gases impart a certain amount of power to the rotor of the turbine.

The turbine is preferably of the mixed pressure type, and in the particular construction herein shown the high pressure gases released during the early portion of the working stroke, and the low pressure or normal exhaust gases released at or near the end of the working stroke, act upon the same turbine blades but upon different portions of such blades.

My invention comprises the novel combination of internal combustion engine and turbine above set forth, also other features of invention hereinafter described and particularly pointed out in the appended claims.

It will be noted that since the main portion of the work done in the turbine is done by high pressure gases released from the engine cylinder during the early portion of the working stroke therein, and since the portion of the high pressure gases so released and passed through the turbine may bear so large a proportion to the total amount of gas ignited in the engine cylinder that only sufficient gas remains in that cylinder to make that engine perform its cycle of operations, the internal combustion engine *per se* may be regarded as charge compression and igniting means for the turbine. However, means may be provided for varying the proportion of high pressure gases so discharged to the turbine to the total quantity of gas ignited in the internal combustion engine, and thereby the internal combustion engine may be made to perform more or less work in addition to the work required for the completion of its cycle of operations; and when the turbine itself is required or designed to perform only a relatively small amount of work, the internal combustion engine may be capable of doing as much, or nearly as much, work, as would be done if the turbine were not connected to such engine.

The turbine will in most cases be constructed to rotate at a high speed and is therefore particularly suitable for the operation of machinery requiring high rotative speed, such for example as cream separators, exhaust fans, and fan blowers, electric generators and centrifugal and other rotary pumps.

The object of my invention is to facilitate the operation of machinery, particularly high speed machinery, by internal combustion engines, and to do this by simple and inexpensive means.

I will now proceed to describe my invention with reference to the accompanying drawings, and will then point out the novel features in claims.

In the said drawings: Figure 1 shows a central vertical section of a combined gas or oil engine and turbine embodying my invention, the section being taken through the axis of the crank shaft of the engine. Fig. 1ª shows a detail vertical axial section of the turbine on a plane at right angles to that of Fig. 1. Fig. 1ᵇ shows a detail top view and partial section of the mechanism for adjusting the duration of opening of the valve 13. Fig. 2 shows a horizontal section of the combined engine and turbine shown in Fig. 1, the section being taken on the irregular section line w—w of Fig. 1. Fig. 3 shows a horizontal section through the rotor of the turbine, the section being taken on the line x—x of Fig. 1. Fig. 4 shows a vertical section taken on the line y—y of Fig. 1. Fig. 5 is a vertical axial section of the upper portion of an engine comprising two cylinders both discharging into a single turbine. Fig. 6 is an elevation and partial section of the upper portion of an engine cylinder and attached turbine, showing the operation by such turbine of a fan arranged to blow air over the engine cylinder.

In the drawings, 1 designates the engine cylinder (shown in this case as an air cooled cylinder provided with the usual radiating ribs), 2 the crank shaft, 3 the connecting rod and 4 the piston.

I have shown an engine of what is known as the four cycle type, but in a broad sense it is immaterial whether the engine employed be of the four cycle type or of the two cycle type. The engine shown is provided with the usual admission valve 5 and exhaust valve 6.

1ª designates an igniter plug. While in the drawings this plug, for simplicity of illustration, is shown as located in the side of the cylinder, in practice it may be located in any of the customary locations of such plugs.

7 designates the turbine casing which in this instance is formed integrally with, and as a projection from, the removable head of the engine cylinder.

8 designates the rotor of the turbine comprising a series of turbine blades 8ª, mounted upon a vertical shaft 8ᵇ supported by a suitable step bearing 8ᶜ, a steadying bearing 8ᵈ being provided at the lower end of the rotor.

9, 9 designates a plurality of exhaust gas nozzles formed in a nozzle ring 9ª fitted within the turbine casing 7 and suitably supported. These exhaust nozzles 9 project gas against the inner portions of the blades 8ª.

The nozzle ring is also provided with other high pressure nozzles 9ᵇ (see Fig. 2) communicating with an annular passage 10 surrounding the exhaust passage 6ª in the turbine casing, which passage is arranged to receive high pressure gases from the engine cylinder 1 through a port 12 leading from the upper end of that cylinder. A valve 13 controls the passage of the high pressure gas from port 12 to annular chamber 10; and this valve is operated by suitable mechanism hereinafter described. In order that it may not be necessary to open the valve 13 against the pressure of the engine cylinder exerted on the entire head of the valve, I may provide said valve with an extension 13ª working within a packing cylinder 13ᵇ. In practice, this cylinder 13ᵇ fits quite closely to valve extension 13ª; in the drawings slight clearance is shown, for clearness of illustration. The packing cylinder 13ᵇ and valve extension 13ª being of considerable length (they may be made as long as desired) and the fit between them being close, little leakage can take place between them; the effect being that by far the greater part of the area of valve 13 is not exposed to the pressure of the engine cylinder. Such leakage as may take place between the valve extension 13ª and packing cylinder 13ᵇ is vented through a duct 13ᶜ into the exhaust passage 6ª. Packing cylinder 13ª is removable and by its removal access may be gained to the valve 13 to regrind same or to remove it.

For operating the inlet valve 5 and exhaust valve 6 I have indicated ordinary valve mechanism comprising reducing gears 15 and 16 driving a cam shaft 14, upon which are suitable cams for operating the valve gear of the valves 5 and 6. A taper cam 17 on shaft 14 is provided for operating the valve rod 18 of the valve 13. By adjusting this cam 17 along the shaft, the period during which the valve 13 remains open may be varied, or the cam may be moved to such position that the valve 13 does not open at all. Preferably the cam 17 is of such design that the valve 13 always opens at about the same portion of the stroke of the piston 4, the variation in the duration of the period of opening of this valve being effected by varying the point of closure of this valve, or cut off, with respect to the stroke of piston 4. Thereby the proportion of gases delivered from the engine cylinder to the turbine, to the gases retained within that engine cylinder to operate the engine and to permit the engine to do external work, may be varied as desired.

For adjusting the cam 17 longitudinally with respect to its shaft 14, various means may be employed. I have indicated for the purpose a lever 21 engaging a groove 22 in said cam and having a dog 25 engaging one or another of a number of notches in a sector 26.

It will be seen that during the operation of this combined engine and turbine, the engine itself operates as an ordinary four cycle engine, except that early in each working stroke valve 13 opens permitting a greater or less proportion of the high pressure charge in the engine cylinder to pass through port 12 and passage 10 into the high pressure nozzles 9$^b$ and thence against the end portions of the turbine blades 8$^a$; the proportion of the charge of high pressure gases in the engine cylinder so passing to the turbine depending upon the adjustment of the cam 17. Also, when the exhaust valve 6 opens, the exhaust of the engine passes through port 6$^a$ and nozzles 9 against the turbine blades 8$^a$. Thereby the exhaust gases impart such power as they may to the rotor of the turbine, at the same time cooling the turbine effectively, since the temperature of the exhaust gases is much lower than that of the high pressure gases. For further cooling the turbine and also for the purpose of increasing the efficiency of the turbine by increasing the volume of working fluid passing through the nozzles 9$^b$ against the turbine blades, and decreasing the otherwise very high velocity of the gases passing through the ports 9$^b$ to the turbine blades, water may be caused to mingle with the high pressure gases before they reach the turbine blades. For this purpose I may provide a suitable water connection and spray nozzle 27. Water sprayed into the high pressure gases is immediately converted into steam by the heat of the gases, the gases being at the same time cooled; and this steam, having greater specific gravity than the gases from the engine cylinder, acts very effectively on the blades of the turbine, besides reducing the velocity of the gases and their temperature, and so making their action on the rotor more efficient, and quenching any flame that may exist in such gases. When water is so sprayed into the gas, the turbine operates as a combined gas and steam turbine.

It will be clear that the turbine may be made in as many stages as desired; for simplicity I have shown a single stage turbine only.

As shown in Fig. 5, a plurality of engine cylinders may discharge into the same turbine. Fig. 5 illustrates one convenient arrangement wherein two engine cylinders are located on opposite sides of the turbine.

As illustrated in Fig. 6, the turbine may operate a fan 28 arranged to force air through a conduit 29 and to discharge such air against the engine cylinder 1, for the purpose of cooling such cylinder.

What I claim is:—

1. The combination with a cylinder of an internal combustion engine provided with means for the exhaust of products of combustion, of a turbine connected to the said exhaust of the engine cylinder and arranged to receive exhaust gases therefrom, a duct other than said exhaust, also connecting the said cylinder to said turbine, and means controlling flow through said duct arranged to permit flow from said cylinder to the turbine during the early portion of the working stroke.

2. The combination with a cylinder of an internal combustion engine provided with means for the exhaust of products of combustion, of a turbine connected to the said exhaust of the engine cylinder and arranged to receive exhaust gases therefrom, a duct other than said exhaust, also connecting the said cylinder to said turbine, and valve means controlling flow through said duct arranged to permit flow from said cylinder to the turbine and to cut off prior to the completion of such working stroke.

3. The combination with a cylinder of an internal combustion engine provided with means for the exhaust of products of combustion, of a turbine connected to the said exhaust of the engine cylinder and arranged to receive exhaust gases therefrom, a duct other than said exhaust, also connecting the said cylinder to said turbine, and valve means controlling flow through said duct arranged to permit flow from said cylinder to the turbine and to cut off prior to the completion of such working stroke, and means for varying the period during which such valve remains open.

4. The combination with a cylinder of an internal combustion engine provided with an exhaust port and with an exhaust valve controlling passage through such port, and means for operating said exhaust valve, said cylinder having also a further port leading therefrom, and a valve controlling flow through such further port and means for opening said valve before the end of the working stroke in said cylinder and before the opening of said exhaust valve, of a mixed pressure turbine connected to both said ports and arranged to receive the discharge therefrom.

5. The combination with a cylinder of an internal combustion engine having an exhaust port and having also a further discharge port and means controlling flow through said exhaust port and through said discharge port, arranged to open the exhaust port near the end of the working stroke, and to open such discharge port at an earlier point in the working stroke, of a mixed pressure turbine arranged to receive the discharge from both such ports.

6. The combination with a cylinder of an internal combustion engine having an exhaust port and having also a further discharge port and means controlling flow through said exhaust port and through said discharge port, arranged to open the exhaust port near the end of the working stroke, and to open such discharge port at an earlier point in the working stroke, of a mixed pressure turbine arranged to receive the discharge from both such ports, and comprising a rotor and separate nozzles for the said two ports of said engine cylinder, such nozzles arranged to discharge against different portions of the same rotor blades.

7. The combination with a cylinder of an internal combustion engine having a head in which is an exhaust port and also a separate discharge port, an exhaust valve controlling flow through the exhaust port, a discharge valve controlling flow through the discharge port, means for operating said valves arranged to open the discharge valve before the exhaust valve opens, and a turbine arranged to receive the gases discharged from both said ports.

8. The combination with a cylinder of an internal combustion engine having a head in which is an exhaust port and also a separate discharge port, an exhaust valve controlling flow through the exhaust port, a discharge valve controlling flow through the discharge port, means for operating said valves arranged to open the discharge valve before the exhaust valve opens, and a turbine arranged to receive the gases discharged from both said ports, said turbine comprising a turbine casing integral with the said cylinder head.

9. The combination with a cylinder of an internal combustion engine having a head in which is an exhaust port and also a separate discharge port, an exhaust valve controlling flow through the exhaust port, a discharge valve controlling flow through the discharge port, means for operating said valves arranged to open the discharge valve before the exhaust valve opens, and a turbine arranged to receive the gases discharged from both said ports, said turbine comprising a turbine casing integral with the said cylinder head, and a rotor within said casing and two sets of nozzles, one set for the exhaust gas, the other set for the higher pressure gas escaping through such discharge port, said nozzles arranged to discharge against different portions of the rotor.

10. The combination with a cylinder of an internal combustion engine provided with means for the exhaust of products of combustion, and provided with a discharge passage separate from such exhaust means, of a valve controlling flow through such discharge passage, said valve provided with an extension, on its pressure side, and a cylinder within which such extension works, whereby the area of said valve exposed to material gas pressure is reduced, of a turbine connected both to such exhaust means and to such separate discharge port.

11. The combination with the cylinder of an internal combustion engine having an exhause passage having spaced walls, and, having also a further discharge passage one wall of which is also one wall of the said exhaust passage, a valve controlling flow through such further discharge passage, and registering openings in the said spaced walls of the exhaust passage, such registering openings being opposite the valve controlling flow through such further discharge passage, and being adapted for the removal of such valve through them, and means normally closing said openings.

12. A combined internal combustion engine and turbine comprising an engine cylinder having a head provided with a turbine stator-casing as an integral part of such head, said stator-casing having within it a nozzle, said combined cylinder head and stator casing having within it a passage leading from the cylinder to the said nozzle, and a turbine rotor arranged to be acted upon by working fluid projected from such nozzle.

13. A combined internal combustion engine and turbine comprising an engine cylinder having a head provided with a turbine stator-casing as an integral part of such head, said stator-casing having within it a plurality of nozzles, said combined cylinder head and stator-casing having within it a plurality of passages leading from the cylinder to different nozzles, means controlling flow of working fluid through said passages to said nozzles, and a turbine rotor arranged to be acted upon by working fluid projected from such nozzles.

14. A combined internal combustion engine and turbine comprising an engine cylinder having a head provided with a turbine stator-casing as an integral part of such head, said stator-casing having within it a plurality of nozzles, said combined cylinder head and stator-casing having within it a plurality of passages leading from the cylinder to different nozzles, means controlling flow of working fluid through said passages to said nozzles, and a turbine rotor arranged to be acted upon by working fluid projected from such nozzles, said rotor having vanes, the said nozzles receiving working fluid from different passages arranged to discharge against different portions of the same rotor vanes.

15. A combined cylinder head and turbine casing comprising a single structure, one portion of which is formed as a cylinder head and another portion of which is formed as a turbine casing, such structure provided with a passage leading from the cylinder-head portion of the structure into the turbine-casing portion of the structure.

16. A combined cylinder head and turbine casing comprising a single structure, one portion of which is formed as a cylinder head and another portion of which is formed as a turbine casing, such structure provided with a passage leading from the cylinder-head portion of the structure into the turbine-casing portion of the structure, said structure further provided with a valve controlling flow through such passage.

17. A combined cylinder head and turbine casing comprising a single structure, one portion of which is formed as a cylinder head and another portion of which is formed as a turbine casing, such structure provided with a plurality of passages leading from the cylinder-head portion of the structure into the turbine casing portion of the structure.

18. A combined cylinder head and turbine casing comprising a single structure, one portion of which is formed as a cylinder head and another portion of which is formed as a turbine casing, such structure provided with a plurality of passages leading from the cylinder-head portion of the structure into the turbine casing portion of the structure, said structure further provided with separate valves for the said passages, each valve controlling flow through its corresponding passage.

19. A combined cylinder head and turbine casing comprising a single structure comprising a cylinder head portion and a turbine casing portion, said structure comprising two parallel passages leading from the cylinder head portion of the structure to the turbine casing portion of the structure, one of said passages comprising a valve seat and valve port, there being openings through the walls of that passage and the parallel passage, registering with such seat and port, and means normally closing said openings.

20. A combined cylinder head and turbine casing comprising a single structure comprising a cylinder head portion and a turbine casing portion, said structure comprising two parallel passages leading from the cylinder head portion of the structure to the turbine casing portion of the structure, one of said passages comprising a valve seat and valve port, there being openings, through the walls of that passage and the parallel passage, registering with such seat and port, and means normally closing said opening comprising a hollow cylinder adapted to receive within it a cylindrical extension of a valve positioned to coact with such valve seat and port.

21. A combined cylinder head and turbine casing comprising a single structure comprising a cylinder head portion and a turbine casing portion, said structure comprising two parallel passages leading from the cylinder head portion of the structure to the turbine casing portion of the structure, one of said passages comprising a valve seat and valve port, there being openings, through the walls of that passage and the parallel passage, registering with such seat and port, and means normally closing said opening comprising a hollow cylinder, and a valve adapted to close said port and to coact with said seat, said valve having an extension adapted to work within and to fit closely the walls of the said cylinder, whereby the effective pressure area of said valve is reduced.

22. The herein described method of operating gas turbines and of cooling the vanes thereof, which comprises compressing and igniting a suitable explosive charge, passing a portion of such charge, while at high pressure, into a suitable turbine and causing the gases to do work against rotor vanes of the turbine, and expanding another portion of such charge, externally to the turbine, and causing such second portion of the charge to do work externally of the turbine, and then delivering such second portion of the charge, so expanded, into the same turbine and against the same rotor vanes thereof, and thereby cooling said vanes because of the lower temperature of the second portion of the charge when so delivered to the turbine.

23. The herein described method of converting heat energy into power, which comprises compressing and igniting a suitable explosive charge, passing a portion of such charge, while at high pressure, into a suitable turbine and causing the gases to do work against rotor vanes of the turbine, and prior to the action of such gases on said vanes injecting a liquid into the gases and by the heat of the gases converting such liquid into steam and by the absorption of latent heat incident to such conversion, reducing the temperature of such gases, and expanding another portion of such charge, externally to the turbine, and causing such second portion of the charge to do work externally of the turbine, and then delivering such second portion of the charge, so expanded, into the same turbine and against the same rotor vanes thereof.

24. A combined cylinder head and turbine casing comprising a single structure, one portion of which is formed as a cylinder head adapted for attachment to and removal from an engine cylinder and another portion of which is formed as a turbine casing, such structure provided with a passage leading from the cylinder head portion of the structure into the turbine-casing portion of the structure, and means for injecting liquid into such passage.

In testimony whereof I have signed this specification in the presence of two subscribing witnesses.

CARL C. THOMAS.

Witnesses:
A. W. BERRISFORD,
J. C. WILSON.